(12) United States Patent
Seo et al.

(10) Patent No.: US 9,372,387 B2
(45) Date of Patent: Jun. 21, 2016

(54) LASER PROJECTOR

(71) Applicant: Hitachi Consumer Electronics Co., Ltd., Tokyo (JP)

(72) Inventors: Yoshiho Seo, Yokohama (JP); Tomoki Kobori, Kamakura (JP); Satoshi Ouchi, Kamakura (JP); Koji Hirata, Yokohama (JP); Junichi Yokoyama, Fujisawa (JP); Hidehiro Ikeda, Yokohama (JP); Masayuki Fukui, Yokohama (JP); Masahiko Yatsu, Fujisawa (JP); Tatsuya Ishikawa, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 496 days.

(21) Appl. No.: 13/757,104

(22) Filed: Feb. 1, 2013

(65) Prior Publication Data
US 2013/0201459 A1    Aug. 8, 2013

(30) Foreign Application Priority Data

Feb. 8, 2012    (JP) .................................. 2012-024655

(51) Int. Cl.
*G03B 21/14*    (2006.01)
*H04N 9/31*    (2006.01)

(52) U.S. Cl.
CPC ............ *G03B 21/147* (2013.01); *H04N 9/3102* (2013.01); *H04N 9/3129* (2013.01); *H04N 9/3135* (2013.01)

(58) Field of Classification Search
CPC . G03B 21/147; H04N 9/3135; H04N 9/3129; H04N 9/31; H04N 9/14; H04N 9/3102; H04N 9/3161; G02B 26/085; G02B 26/101; G02B 26/0833; G02B 26/0841; G02B 26/10; G02B 27/0031

USPC ................ 353/98, 85; 348/739, 744
See application file for complete search history.

(56) References Cited

U.S. PATENT DOCUMENTS 8,783,874 B1 * 7/2014 Riza ................................. 353/31
2005/0237493 A1 * 10/2005 Tajiri ............................. 353/85
(Continued)

FOREIGN PATENT DOCUMENTS

| CN | 101421661 A | 4/2009 |
|---|---|---|
| JP | 2005-526289 A | 9/2005 |
| JP | 2008-009074 A | 1/2008 |
| JP | 2009-193008 A | 8/2009 |
| JP | 2010-008614 A | 1/2010 |
| WO | 03/098918 A1 | 11/2003 |

OTHER PUBLICATIONS

Chinese Office Action, with partial translation, for Chinese Appln. No. 201310047458.8, dated Oct. 24, 2014, 6 pgs.
(Continued)

*Primary Examiner* — Christina Riddle
*Assistant Examiner* — Christopher Lamb, II
(74) *Attorney, Agent, or Firm* — Volpe and Koenig, P.C.

(57) ABSTRACT

A laser projector includes a laser light source to emit laser light modulated in accordance with image information, a scanner to drive the laser light along two axes in horizontal and vertical directions and make scanning two-dimensionally with the laser light, a scanning mirror drive part to produce a drive signal of the scanner, a light source data conversion part to change arrangement in a horizontal direction of data applied to the laser light source and a timing generation part to synchronize the scanning mirror drive part with the light source data conversion part, and a start direction of laser scanning in the horizontal direction is changed every frame of the image information.

2 Claims, 13 Drawing Sheets

(56) References Cited

U.S. PATENT DOCUMENTS

| | | | |
|---|---|---|---|
| 2009/0059179 A1* | 3/2009 | Kobori | G03B 21/00 353/52 |
| 2010/0014058 A1* | 1/2010 | Imai | 353/98 |
| 2010/0259727 A1* | 10/2010 | Nagayoshi | G02B 27/104 353/20 |
| 2011/0205497 A1* | 8/2011 | Wakabayashi et al. | 353/28 |

OTHER PUBLICATIONS

Unabridged Dictionary of Flat Panel Display, Japan, Kogyo Chosakai Publishing Co., Ltd., pp. 810-811, with partial translation.

Japanese Office Action, with partial translation, for Japanese Appln. No. 2012-024655, dated Feb. 17, 2015, 5 pgs.

* cited by examiner

BEAM LOCI AT PERIPHERAL PART OF IMAGE
BEAM LOCI IN CENTER OF IMAGE
BEAM LOCI AT PERIPHERAL PART OF IMAGE

---- BEAM LOCUS OF ODD FRAME      ◯ BEAM SHAPE OF ODD FRAME

--- BEAM LOCUS OF EVEN FRAME      ⚪ BEAM SHAPE OF EVEN FRAME

BEAM LOCI AT PERIPHERAL PART OF IMAGE    BEAM LOCI IN CENTER OF IMAGE    BEAM LOCI AT PERIPHERAL PART OF IMAGE

—·—·· BEAM LOCUS OF ODD FIELD    ◯ BEAM SHAPE OF ODD FIELD

—···—· BEAM LOCUS OF EVEN FIELD    ◌ BEAM SHAPE OF EVEN FIELD

LASER PROJECTOR

INCORPORATION BY REFERENCE

The present application claims priority from Japanese application JP2012-024655 filed on Feb. 8, 2012, the content of which is hereby incorporated by reference into this application.

BACKGROUND OF THE INVENTION

The present invention relates to a laser projector which makes scanning with light from a laser light source modulated by image information on a projection screen to display an image.

The laser projector makes scanning two-dimensionally with light beam by means of a deflection element such as MEMS mirror to thereby project a display image on the projection screen so as to draw or display the image. The light beam can be realized by combining a laser and a lens, although the light beam is not required to be a completely collimated beam and may be light which is focused at target distance.

Further, as the deflection element, a device having a small mirror oscillated physically is given. In order to display two-dimensional image, an axis for movement at high speed is combined with an axis for movement at low speed generally. The axis for movement at high speed can be realized at low power with wide amplitude by resonating a mirror. In the axis for movement at low speed, a mirror can be non-resonated to thereby lengthen a display period and reduce distortion.

An example of the above laser projector is disclosed in JP-A2005-526289.

SUMMARY OF THE INVENTION

Figure 1:
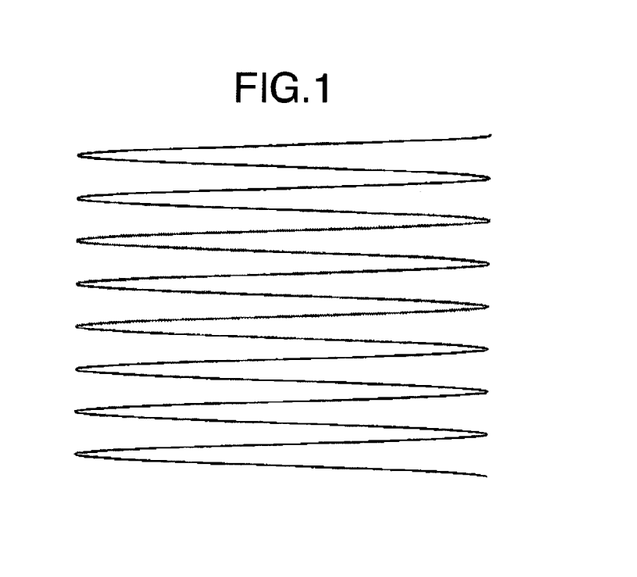
FIG. 1 is a diagram showing a beam scanning locus.

In the above-mentioned laser projector, the mirror is moved in one axial direction at high speed in the resonance state to be oscillated in the right and left directions (in the horizontal direction) and at the same time as this movement the mirror is moved in the other axial direction at low speed in the non-resonance state to be oscillated in the up and down directions (in the vertical direction). This mirror operation makes laser scanning on the projection screen corresponding to one frame of image information as shown in FIG. 1. In detail, the resonance operation of the mirror corresponds to plural lines constituting one frame of the image information and laser scanning in the left direction and laser scanning in the right direction are repeated to display the image.

As apparent from FIG. 1, turns of the scanning beam occur at ends in the right and left directions (horizontal direction) of laser scanning and accordingly spaces between beams are in non-uniform and rough and dense state. On the other hand, the beam spaces are uniform in the center of the laser scanning.

As described above, since the beam spaces are different in center and at ends of the screen, there arises a problem that the resolution in the center of the screen is different from that at the ends and particularly the resolution in the vertical direction is lower at ends. Accordingly, in the prior art, the center part having less influence of turns of beam scanning is utilized to avoid this problem. However, this method has a problem that since the display period of the scanning period is reduced, the size of the scanned screen is small and the luminescence duty is reduced.

It is an object of the present invention to provide a laser projector in which the resolution is suppressed from being reduced even at ends of screen.

In order to solve the above problem, the laser projector according to the present invention is a display unit which displays an image by two-dimensional scanning having an axis along which scanning operation with light beam is made at high speed and an axis along which scanning operation with light beam is made at low speed and is operated in a scanning method in which scanning operation with light beam is made at low speed along the axis at the period of 2n+1 times as long as an operation period of the scanning operation with light beam which is made at high speed along the axis and the one frame of the display screen is divided into two fields. Further, a first operation direction of the scanning operation with light beam which is made along the axis at high speed in one field is opposite to a first operation direction of the scanning operation with light beam which is made along the axis at high speed in the other field. In a set viewing distance, the size of light beam is set to be about 1.5 times or more as large as the value obtained by dividing a screen range defined by the scanning operation which is made along the axis at low speed by the number of display lines.

Further, the laser projector according to the present invention is a display unit which displays an image by two-dimensional scanning having an axis along which scanning operation with light beam is made at high speed and an axis along which scanning operation with light beam is made at low speed. In a scanning method of the laser projector, scanning operation with light beam is made at low speed along the axis at the period of $n+\frac{1}{2}$ times as long as an operation period of the scanning operation with light beam which is made at high speed along the axis and the one frame of the display screen is divided into four fields. The first scanning operation which is made at high speed along the axis is started from end in first and third fields and the first scanning operation which is made at high speed along the axis is started from center in second and third fields. In the set viewing distance, the size of light beam is set to be about 1.5 times or more as large as the value obtained by dividing a screen range defined by the scanning operation which is made along the axis at low speed by the number of display lines.

Moreover, the laser projector according to the present invention is a display unit which displays an image by two-dimensional scanning having an axis along which scanning operation with light beam is made at high speed and an axis along which scanning operation with light beam is made at low speed and in which scanning operation with light beam is made at low speed along the axis at the period of 2n+1 times as long as an operation period of the scanning operation with light beam which is made at high speed along the axis and the one frame of the display screen is divided into two fields. Further, the field is each divided into two sub-fields and the direction of scanning operation which is made at low speed in one sub-field is opposite to that of scanning operation which is made at low speed in the other sub-field. The first direction of scanning operation which is made at high speed along the axis in one field is opposite to the first direction of scanning operation which is made at high speed along the axis in the other field. The scanning operation which is made at low speed along the axis is delayed by a quarter of the operation period of the scanning operation which is made at high speed along the axis.

At this time, the size of light beam may be about 1.5 times or more as large as the value obtained by dividing a screen range defined by the scanning operation which is made at low speed along the axis by the number of display lines in the set viewing distance.

In a display unit which displays an image by two-dimensional scanning having an axis along which scanning operation with light beam is made at high speed and an axis along which scanning operation with light beam is made at low speed, the one frame of the display screen is divided into two or more fields or sub-fields. In a driving method in which beam loci in the fields or sub-fields are different, the beam at peripheral part of the screen is 1.5 times or more as large as the beam in the center of the screen in an axial direction along which scanning operation with the beam is made at low speed.

In a display unit which displays an image by two-dimensional scanning having an axis along which scanning operation with light beam is made at high speed and an axis along which scanning operation with light beam is made at low speed, the one frame of the display screen is divided into two or more fields or sub-fields. In a driving method in which beam loci in the fields or sub-fields are different, two deflection elements for the axis along which scanning operation is made at high speed and the axis along which scanning operation is made at low speed are provided. An optical element for enlarging the beam shape in a direction of the axis along which scanning operation is made at low speed at peripheral part as compared with the center part is disposed between the deflection element for the axis along which scanning operation is made at high speed and the deflection element for the axis along which scanning operation is made at low speed.

According to the present invention, reduction in the resolution at ends in the horizontal direction of the screen can be suppressed and the displayable period can be expanded, so that the brightness of the image can be improved by enlargement of the display screen and improvement of the luminescence duty.

Other objects, features and advantages of the invention will become apparent from the following description of the embodiments of the invention taken in conjunction with the accompanying drawings.

DESCRIPTION OF THE EMBODIMENTS

Embodiments of a laser projector according to the present invention are now described with reference to the accompanying drawings.

Embodiment 1

As described above, in the related-art laser scanning, the beam scanning is started in the same direction every frame. In the embodiment, the start direction of beam scanning is changed alternately every frame. Consequently, rough and dense places of beam spaces are opposite every frame at ends in the horizontal direction of the beam scanning and accordingly reduction in apparent resolution can be prevented.

Figure 3:
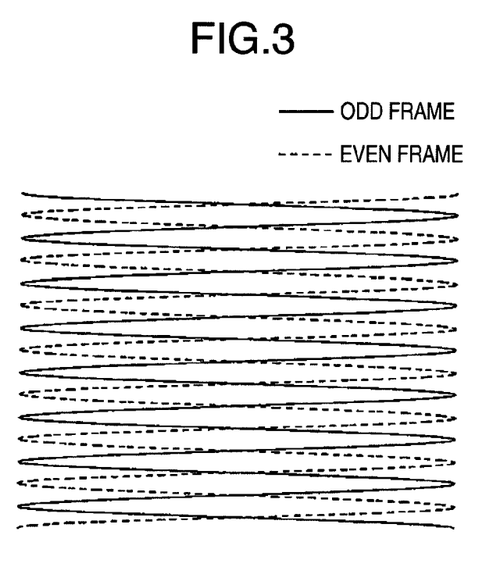
FIG. 3 is a diagram showing beam scanning loci in the embodiment 1.

FIG. 3 is a diagram illustrating the beam scanning in the embodiment. In the embodiment, a display screen is divided into two kinds of frames having odd and even frames to be displayed alternately. The odd frame is started from scanning made from left to right (left scanning) and the even frame is started from scanning made from right to left (right scanning).

As shown in FIG. 3, when the number of beam scanning lines in the horizontal direction is odd and the start positions in the vertical direction of the even frame and the odd frame are the same, the place where the beam scanning lines for the even frame are rough corresponds to the place where the beam scanning lines for the odd frame are dense. Accordingly, the roughness and denseness of the beam scanning lines are complemented to improve the apparent resolution at the ends in the horizontal direction.

Figure 2:
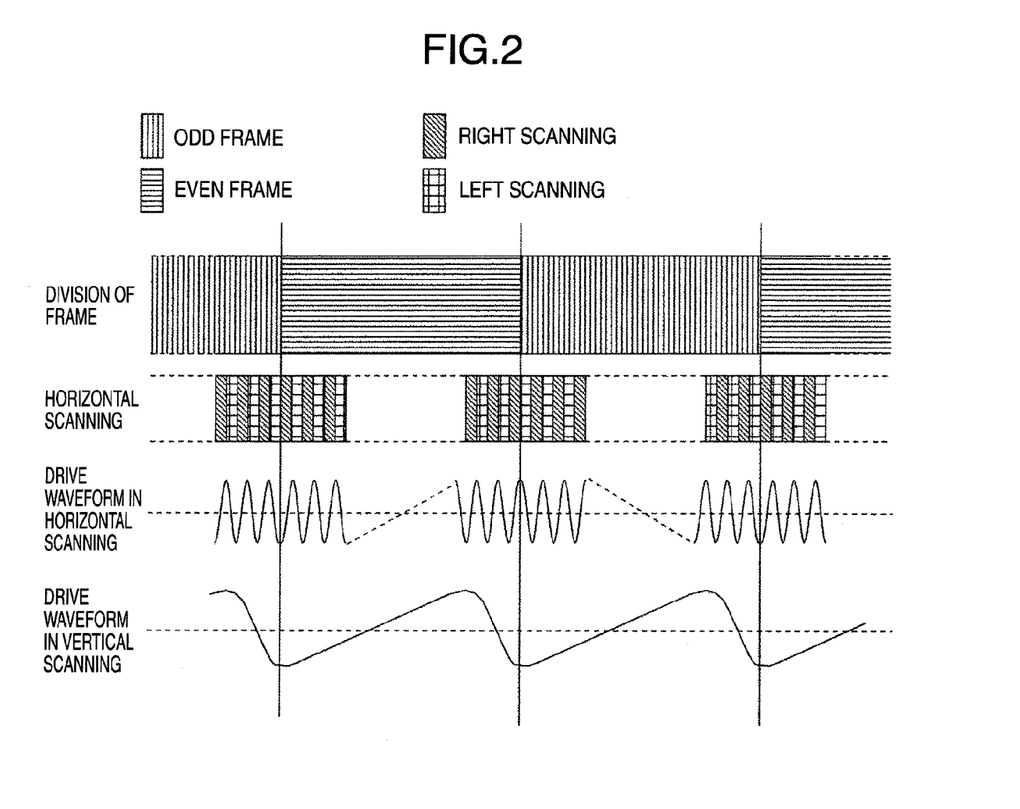
FIG. 2 is a timing chart in an embodiment 1.
Figure 6:
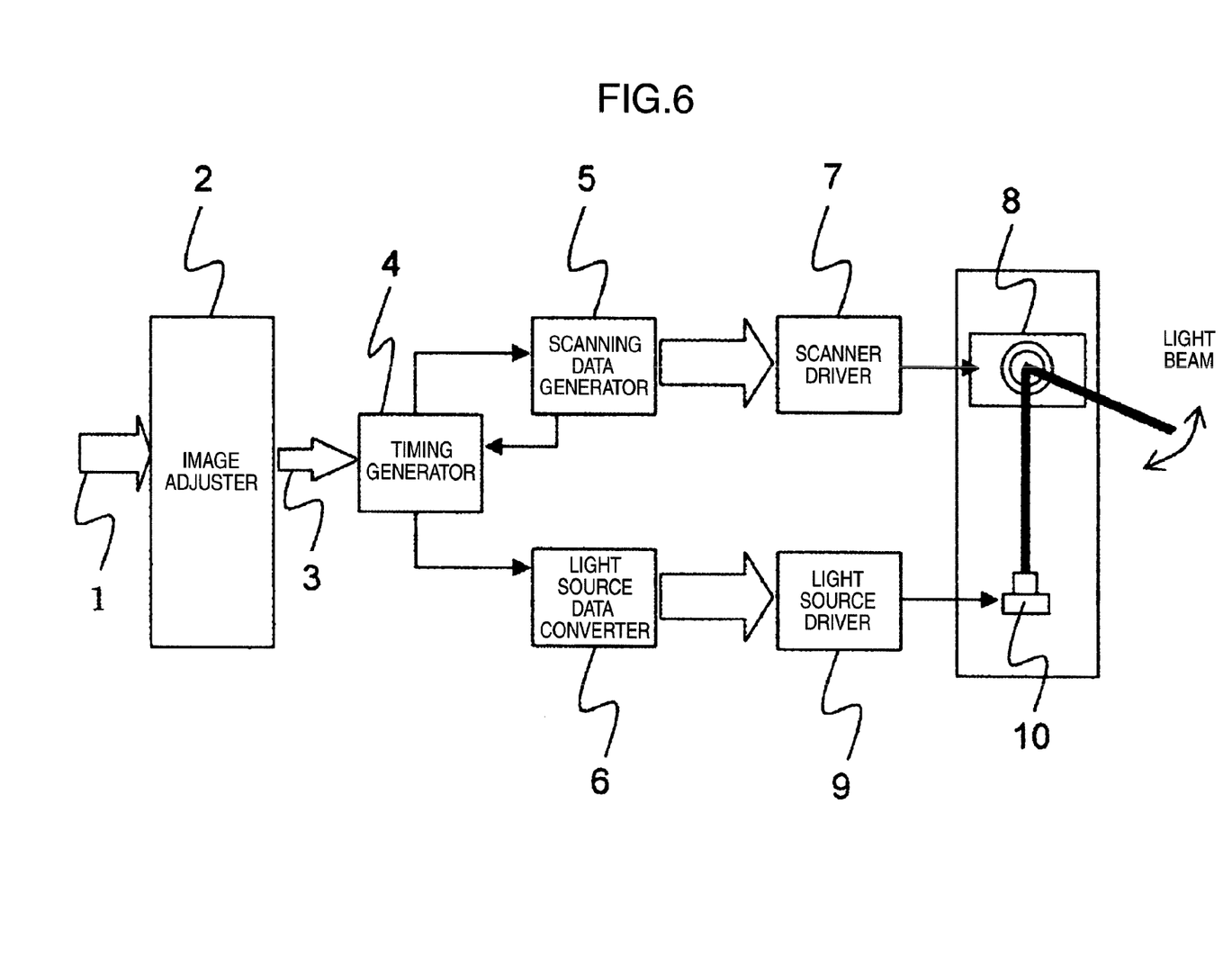
FIG. 6 is a diagram illustrating a hardware configuration of the embodiment 1.

FIG. 6 schematically illustrates a beam scanning control circuit for making the above beam scanning and FIG. 2 shows the timing thereof.

As shown in FIG. 6, the beam scanning control circuit of the embodiment includes a light source 10 for emitting light, an light source driver 9 for driving the light source 10 on the basis of input data, a light source data converter 6 for converting image data inputted on the basis of characteristics of the light source to supply data to the light source driver 9, a scanner 8 such as MEMS mirror for making two-dimensional scanning with light emitted from the light source 10, a scanner driver 7 for driving the scanner 8 on the basis of the input data, a scanning data generator 5 for generating a drive signal corresponding to characteristics of the scanner 8 in accordance with a desired image update rate to be supplied to the scanner driver and a timing generator 4 for synchronizing the light source data converter and the scanning data generator. The beam scanning control circuit further includes an image adjuster 2 for adjusting an image generally.

Further, "driver", "converter", "scanner" and "generator" used in the present invention are names of devices and, as more concrete forms, may be composed of individual IC's or IC group having complex functions performed by some elements functioning as one device. Moreover, even the case where plural devices are realized by plural IC groups falls within the spirit and scope of the present invention.

Next, operation of the beam scanning control circuit of the embodiment is described with reference to the timing chart of FIG. 2.

The image data 1 to be displayed by making beam-scanning by the beam scanning control circuit of the embodiment is subjected to image adjustment by the image adjuster 2 to generate the processed image data 3. The timing generator 4 classifies the image data 1 (processed image data 3) into two frames of odd frame and even frame in synchronism with the image data 1. Further, the timing generator 4 controls timing of horizontal scanning drive waveform and vertical scanning drive waveform which are drive waveforms of the scanner 8 synchronized with light source data.

The light source data converter 6 changes arrangement of image data in the horizontal scanning alternately so that the horizontal scanning is started from left scanning in the odd frame on the basis of classification information of odd and even frames by the timing generator 4. Similarly, arrangement of image data in the horizontal scanning is changed alternately so that the horizontal scanning is started from right scanning in the even frame.

Figure 4:
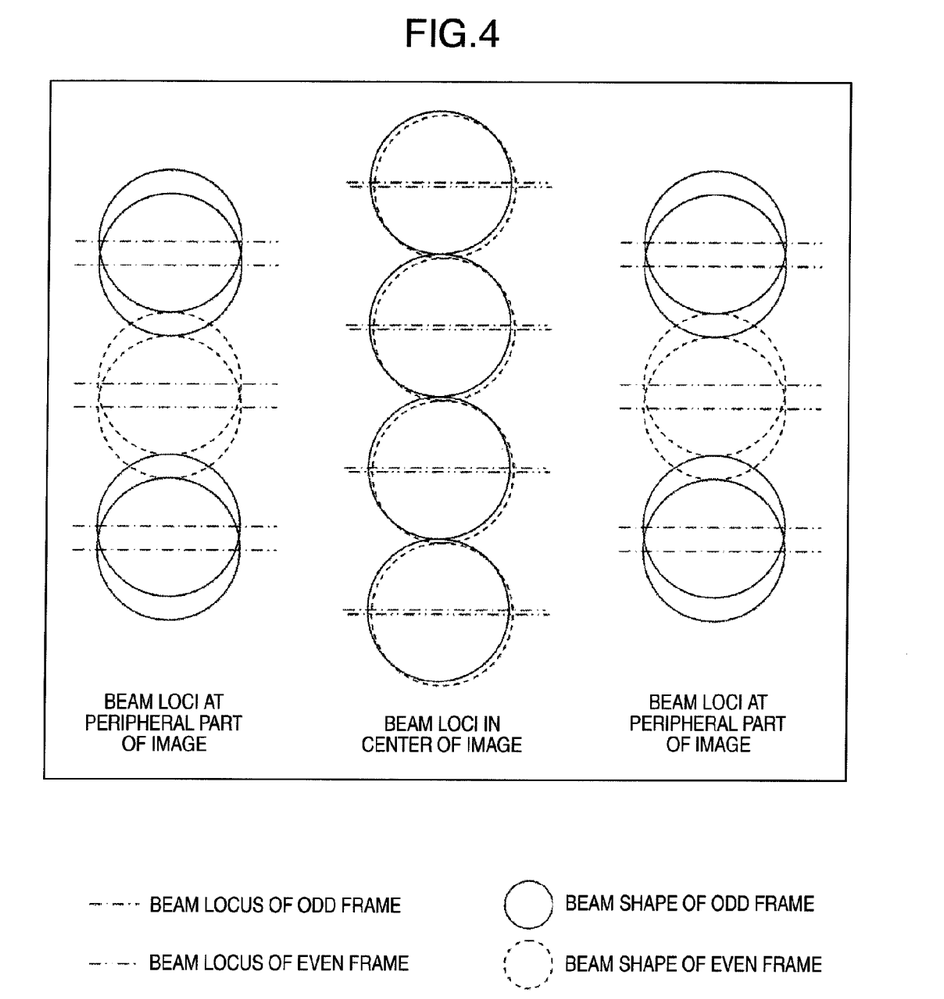
FIG. 4 is a diagram showing display states in case of circular beam.
Figure 5:
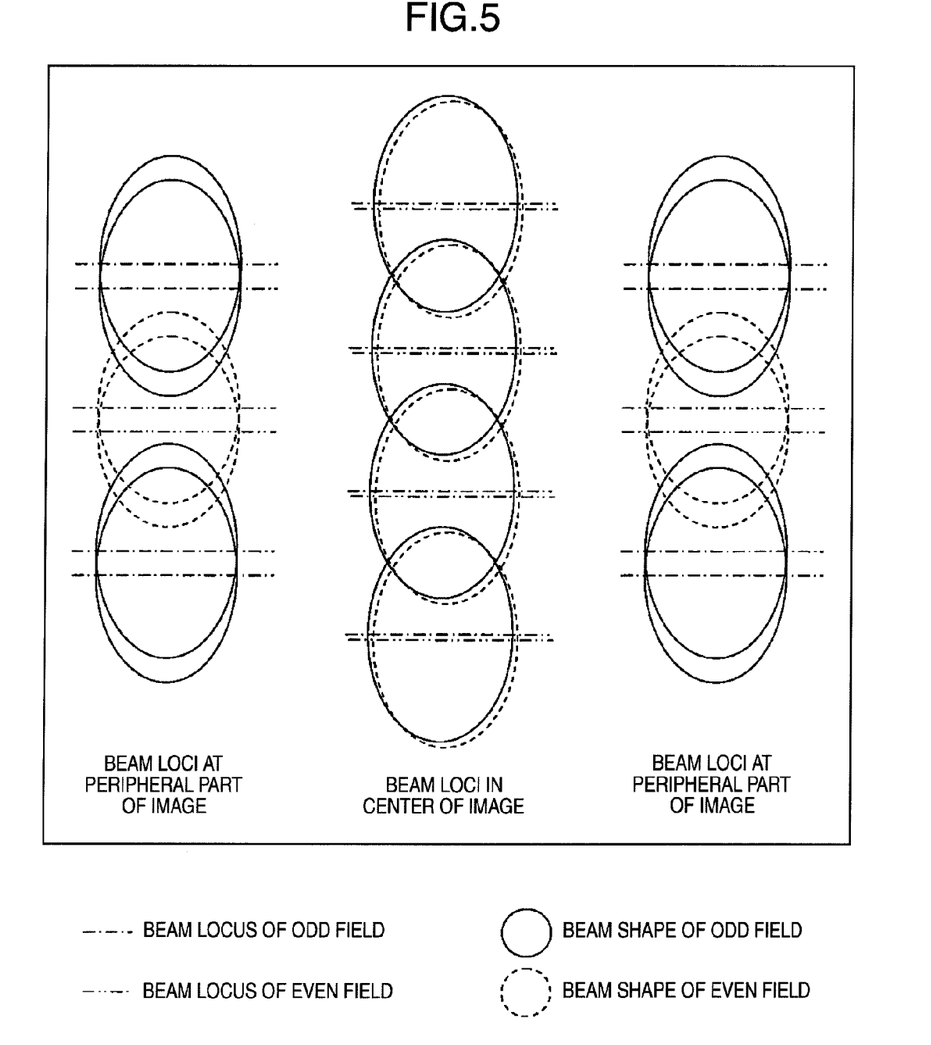
FIG. 5 is a diagram showing display states in case of elliptic beam.

In the embodiment, a diameter of laser beam may be changed. FIG. 4 is a diagram showing the case of a circular beam. In order to improve the connectivity of the scanning beam in the vertical direction, the length of beam in the vertical direction is made longer than a value obtained by dividing the length of the screen in the vertical direction by the number of display lines in the vertical direction so that the scanning beams may overlap each other as shown in FIG. 5. More concretely, the length of beam in the vertical direction is about 1.5 times as large as by dividing the length of the screen in the vertical direction by the number of display lines in the vertical direction to thereby prevent flicker.

Embodiment 2

Figure 8:
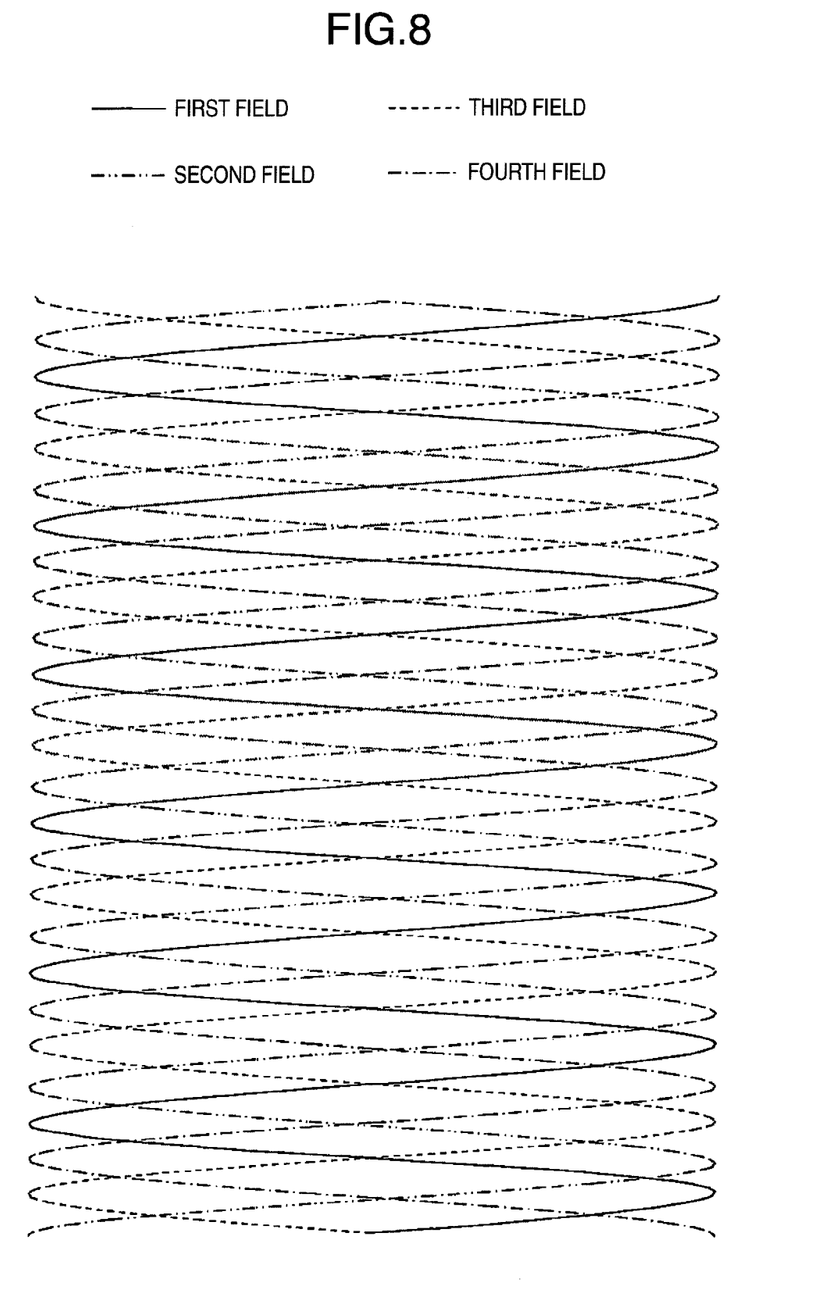
FIG. 8 is a diagram showing beam scanning loci in the embodiment 2.

In the embodiment 1, an example of improving reduction in the resolution at ends in the horizontal direction has been described. However, it seems that the resolutions at ends in the horizontal direction are different from that in the center in the horizontal direction. In the embodiment, a method of improving it is described. In the embodiment 2, four frame periods forming the display screen are classified into four types which are named a first field, a second field, a third field and a fourth field. FIG. 8 shows beam scanning loci in the embodiment.

As shown in FIG. 8, in the first and third fields, drawing of image is started from right or left end of the screen and in the second and fourth fields, drawing of image is started by right or left scanning from the center of the screen. The turn points at ends in the horizontal direction are increased and intersection points of scanning beams are increased even in the center, so that visual difference at ends and in the center in the horizontal direction is reduced.

Figure 7:
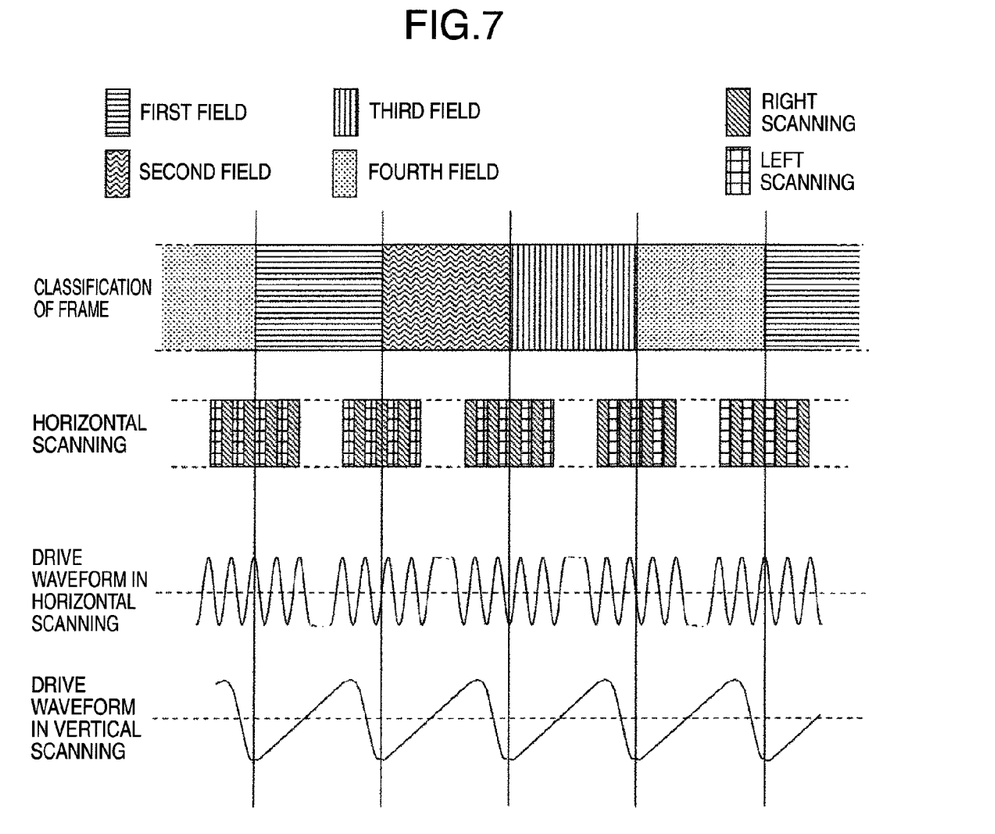
FIG. 7 is a timing chart in an embodiment 2.

Operation of the beam scanning control circuit of the embodiment is shown by the timing chart of FIG. 7. Similarly to the embodiment 1, the timing is controlled by the timing generator 4.

Such scanning as in the embodiment can be made to increase the number of apparent lines in the vertical direction without increasing the scanning speed in the horizontal and the visual difference at ends and in the center can be reduced.

Further, even in the embodiment, the length of beams in the vertical direction can be made longer than the value obtained by dividing the length of the screen in the vertical direction by the number of display lines, so that overlap of the scanning beams can be formed similarly to the embodiment 1.

Embodiment 3

Figure 9:
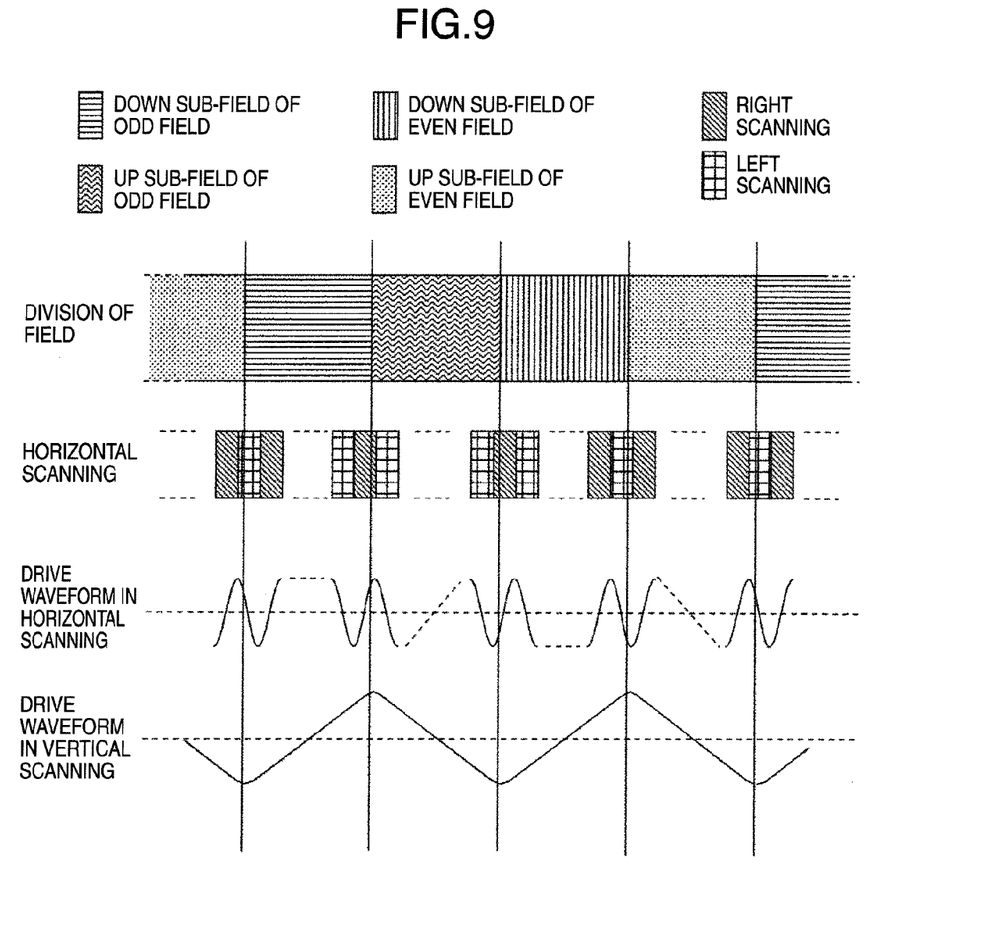
FIG. 9 is a timing chart in an embodiment 3.
Figure 10:
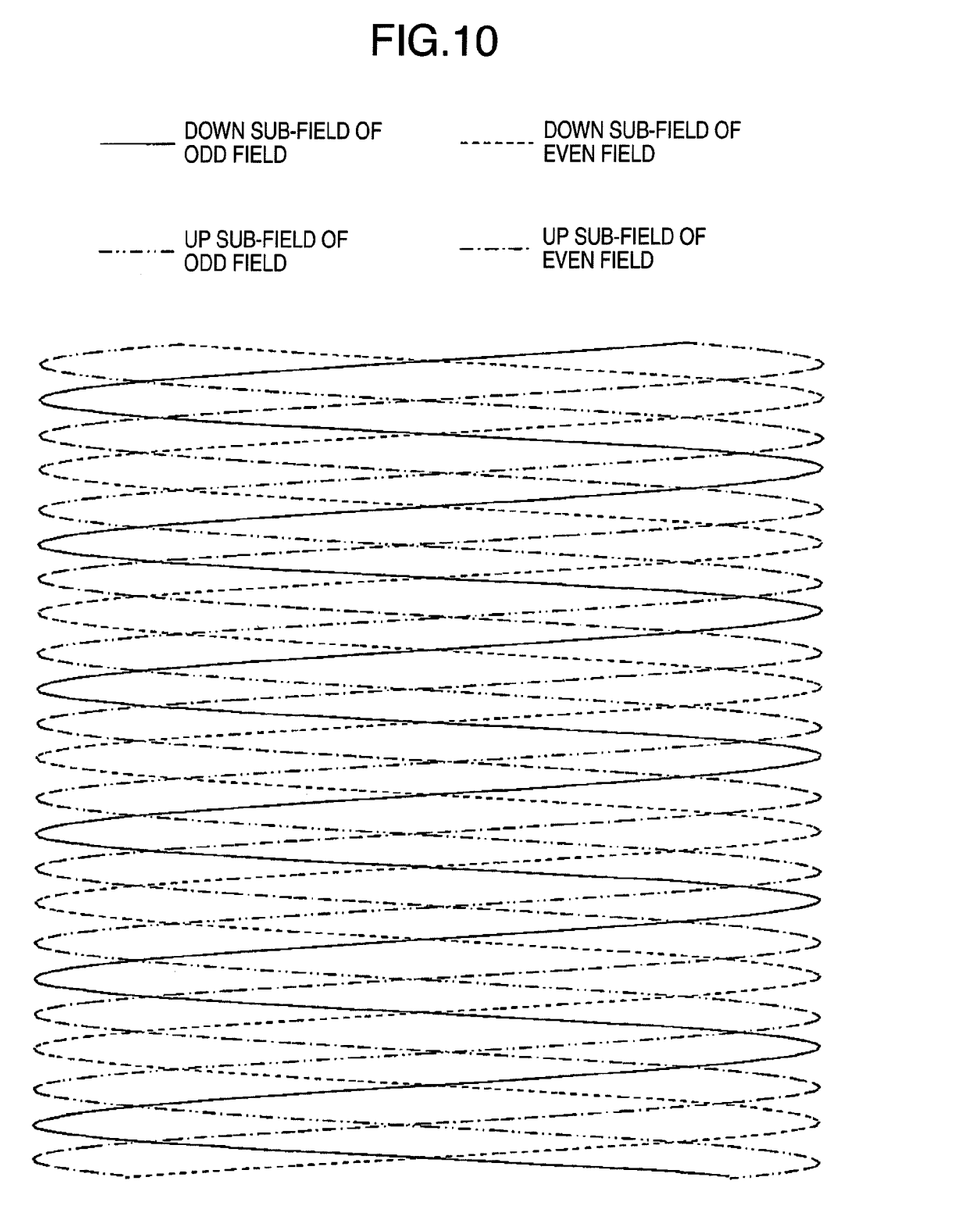
FIG. 10 is a diagram showing beam scanning loci in the embodiment 3.

Referring now to FIGS. 9 and 10, another embodiment of beam scanning is described. In the embodiment, two frame periods corresponding to the display screen are classified into two fields and one of the fields is defined to an even field and the other is defined to an odd field. Further, the even and odd fields are each classified into two sub-fields. One of the sub-fields is named a down sub-field as a period that the image is drawn downward from upper part in the vertical direction of the screen. Further, the other is named an up sub-field as a period that the image is drawn upward from lower part in the vertical direction of the screen. The number of horizontal synchronous signals contained in the field period is odd. By doing so, when the scanning is started from right scanning in the odd field, the scanning is started from left scanning in the even field. Further, it is assumed that the start position in each field is delayed by a quarter of the scanning period in each scanning. The scanning period represents a series of periods that right or left scanning is made.

As shown in FIG. 10, in the down sub-field of the odd field, a position shifted by a quarter of the horizontal scanning period from right upper end of the screen is a starting point of scanning and the beam scanning is made from the starting point. In the down sub-field of the even field, a position shifted by a quarter of the horizontal scanning period from left upper end of the screen is a starting point of scanning and the beam scanning is made from the starting point. In the up sub-field of the odd field, a position shifted by a quarter of the horizontal scanning period from right lower end of the screen is a starting point of scanning and the beam scanning is made upward from lower part in the vertical direction of the screen from the starting point. In the up sub-field of the even field, a position shifted by a quarter of the horizontal scanning period from left lower end of the screen is a starting point of scanning and the beam scanning is made upward from lower part in the vertical direction of the screen from the starting point.

Since the beam scanning is made as shown by loci of beams of FIG. 10, intersection points of the scanning beams occur in parts or places except the center part in the horizontal direction and accordingly change or difference in the resolution of the image can be made uniform.

Operation of the beam scanning control circuit of the embodiment is shown by the timing chart of FIG. 9. The timing is controlled by the timing generator 4 similarly to the embodiment 1. In the embodiment 3, the beam scanning is made in the up direction from lower part in the vertical direction of the screen similarly to operation of vertical retrace lines of the embodiments 1 and 2.

Further, even in the embodiment, the length of beams in the vertical direction can be made longer than the value obtained by dividing the length of the screen in the vertical direction by the number of display lines, so that overlap of the scanning beams can be formed similarly to the embodiment 1.

Embodiment 4

As described in the embodiments 1 to 3, the screen can be divided into plural fields and display positions can be shifted every field, so that the number of display lines can be increased without increasing the horizontal scanning speed and it is very effective. However, on the other hand, when overlap of beams is small, there is a problem that flicker in the image is recognized. In the embodiments 1 to 3, the beams overlap each other to avoid this problem. However, in this measure or method, overlap of beams occurs even in the center part of the screen in which overlap is not required originally, so that intensification is deteriorated.

Figure 11:
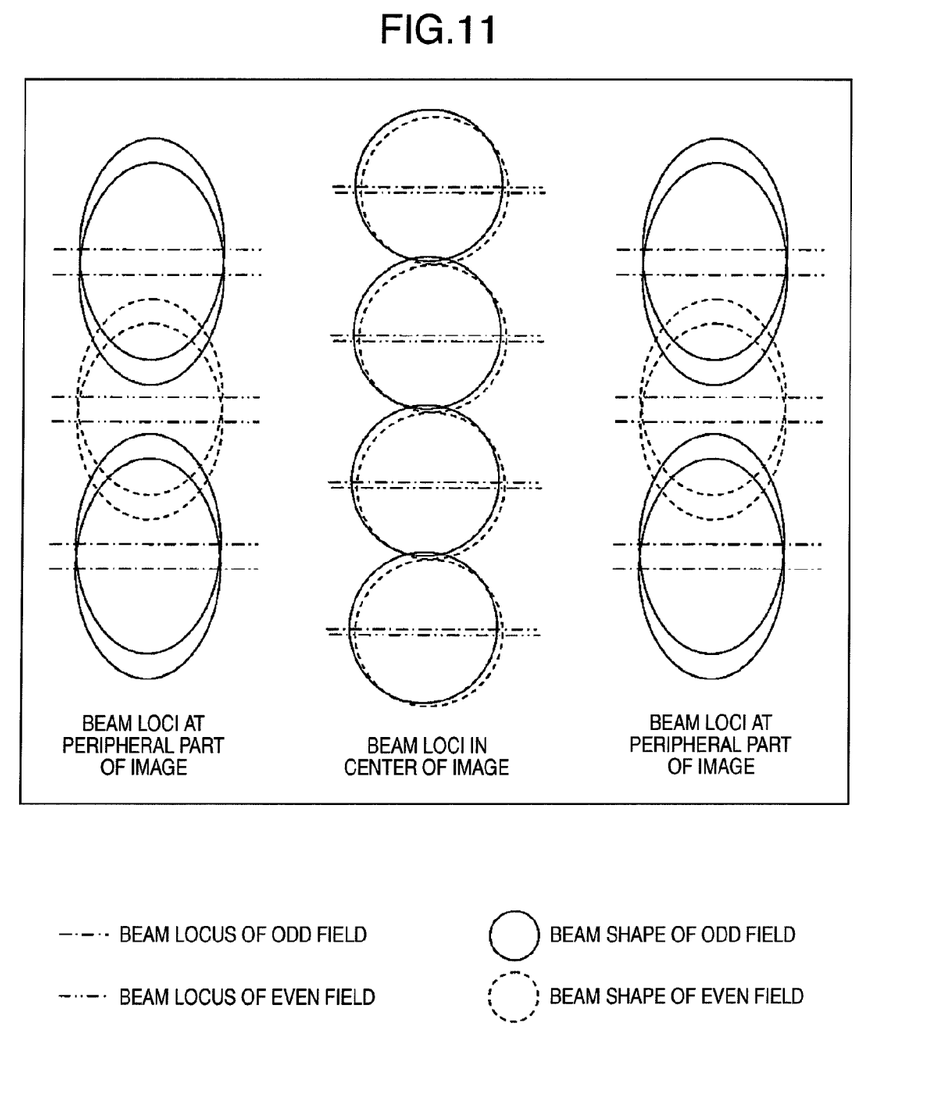
FIG. 11 is a diagram showing beam display states in an embodiment 4.

Accordingly, in the embodiment 4, as shown in FIG. 11, the shape and size of the beams are differentiated in the center and at the peripheral parts of the screen. In other words, the beam size is substantially equal to the value obtained by dividing the length of the screen in the vertical direction by the number of lines in the center of the screen and the length of beam in the vertical direction is made longer than the value obtained by dividing the length of the screen in the vertical direction by the number of lines at the peripheral parts of the screen.

Figure 12A:
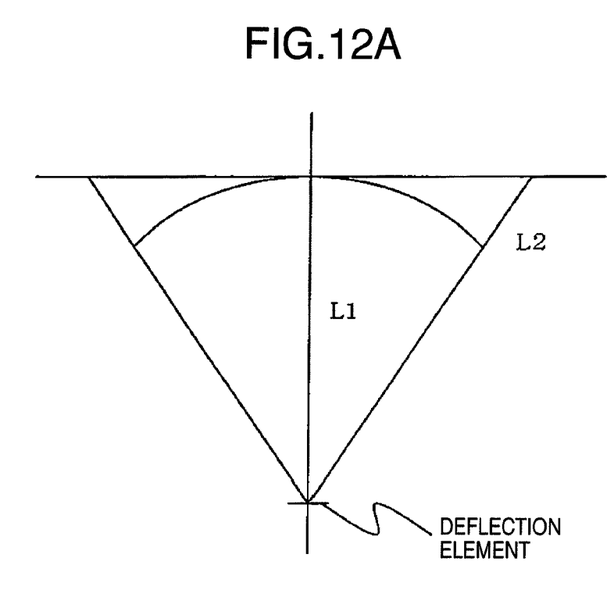
FIGS. 12A and 12B illustrate other beam display states in the embodiment 4.
Figure 12B:
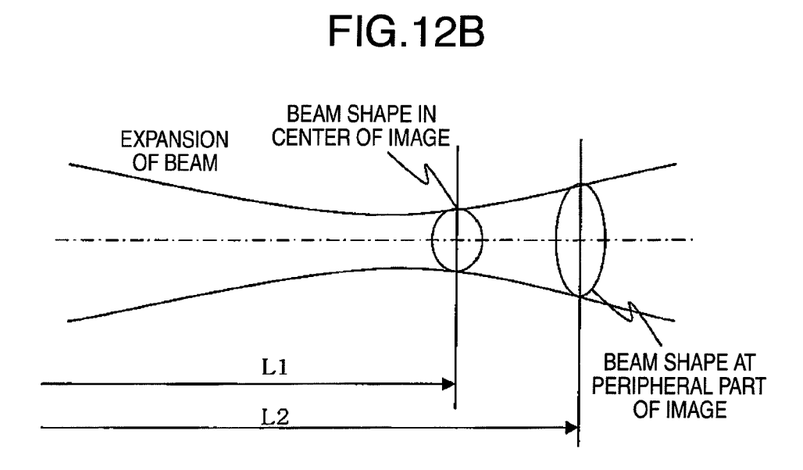

More concretely, the fact that the beam traveling distance is different in the center and at the peripheral parts of the screen is utilized. As shown in 12A illustrating the display unit in a plan view and in 12B illustrating the beam in a side view, the beam traveling distance to the screen is lengthened at the peripheral parts of the screen as compared with the center of the screen. Accordingly, the beam having a proper spread can be designed to form the beam as shown in FIG. 11.

Figure 13:
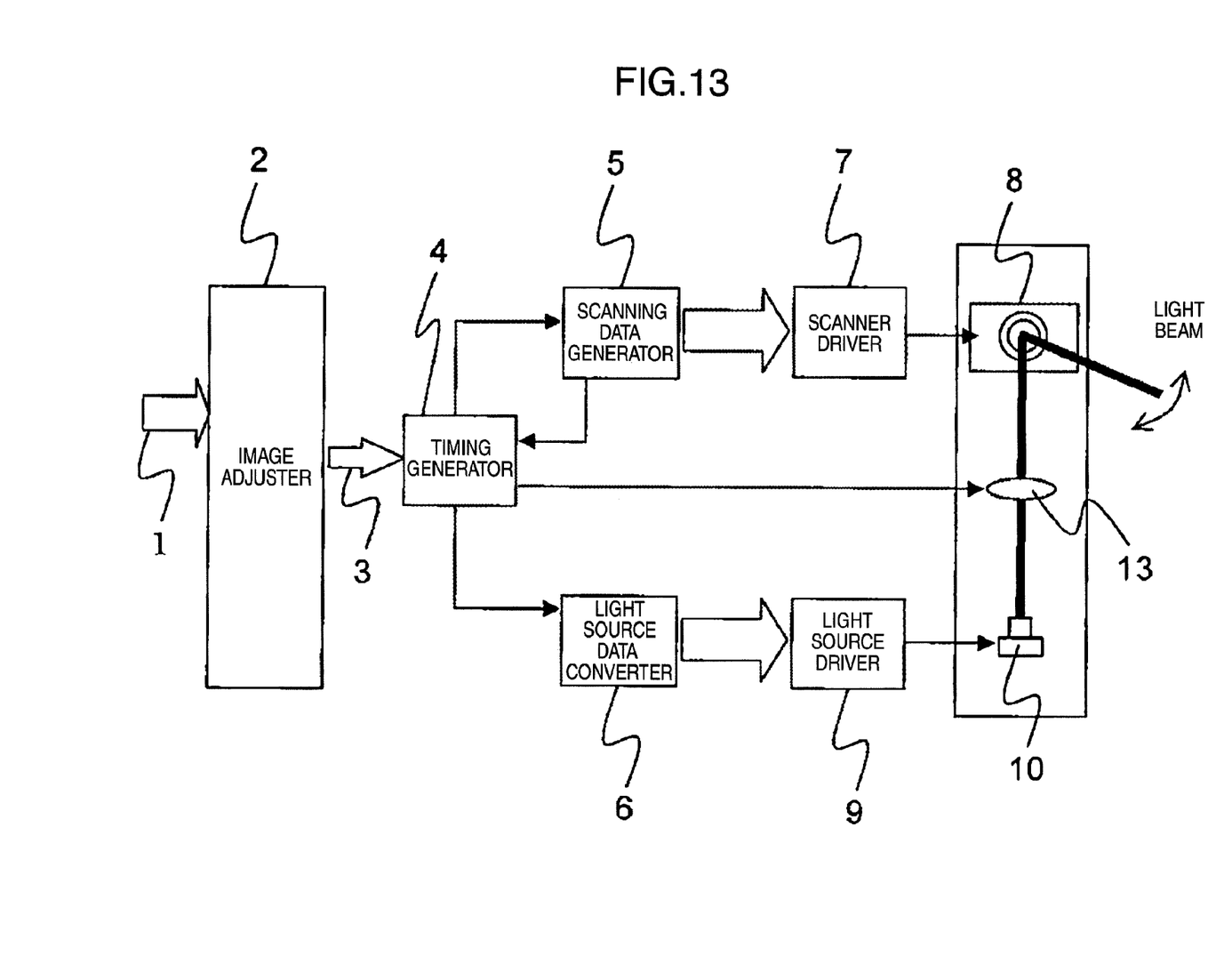
FIG. 13 is a diagram illustrating a hardware configuration of the embodiment 4.

Furthermore, as shown in FIG. 13, a focusing lens 13 is disposed between the light source 10 and the scanner 8 and is controlled by the timing generator 4. By doing so, the focus size in the center and at the peripheral parts of the screen can be adjusted properly.

Embodiment 5

Next, another embodiment in which beam diameters in the center and at the peripheral parts of the screen are controlled is described. In the embodiment 5, the beam shape and size in the center and at right and left peripheral parts of the screen are differentiated. In other words, in the center of the screen the beam size is substantially equal to the value obtained by dividing the length of the screen in the vertical direction by the number of lines and at the peripheral parts of the screen the length of beam in the vertical direction is made longer than the value obtained by dividing the length of the screen in the vertical direction by the number of lines.

Figure 14:
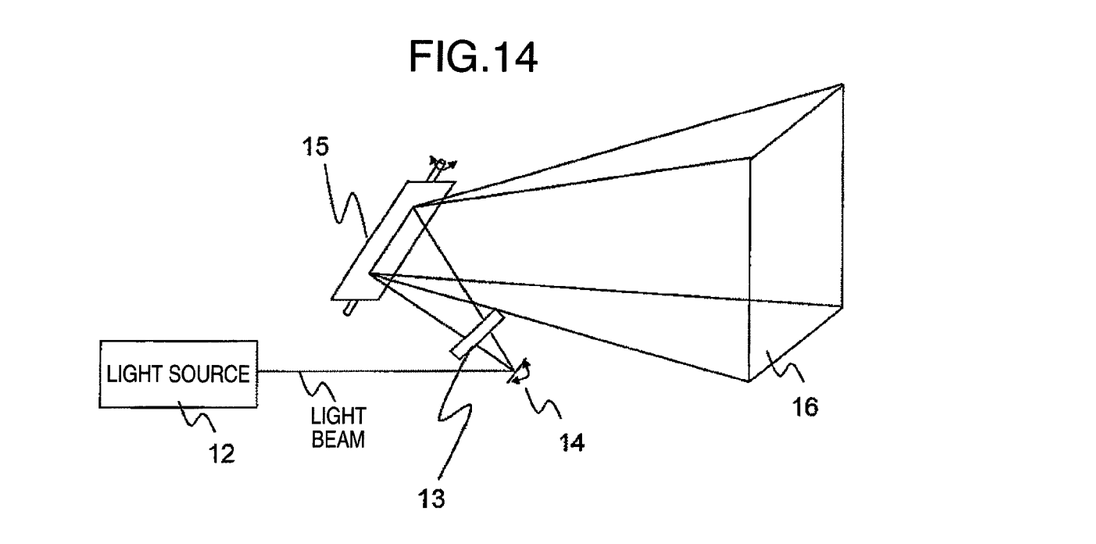
FIG. 14 illustrates a projector of an embodiment 5.

The configuration of the embodiment is illustrated in FIG. 14. Concretely, the deflection element is divided into a horizontal deflection element 14 and a vertical deflection element 15. First, the light beam is formed into linear by the horizontal deflection element 14 and the light beam is formed into sheet or surface by the vertical deflection element 15. The optical element (beam shaping element) 13 is disposed between the horizontal deflection element 14 and the vertical deflection element 15. More concretely, an optical element which enlarges the image in the direction crossing the line at right angles at the peripheral parts without enlarging the image in the center of line is disposed.

Figure 15:
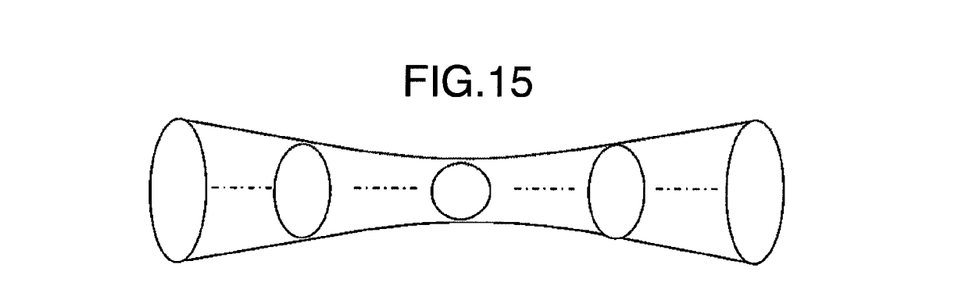
FIG. 15 is a diagram showing a beam display state in the embodiment 5.

FIG. 15 shows the beam loci on the vertical deflection element 15 after passage of the beam shaping element 13. The scanning can be made along the beam loci by the vertical deflection element 15 in the vertical direction to thereby suppress overlap of the beams in the center of the screen and form overlap of the beams at the peripheral parts. The beam shaping element used in the embodiment does not require active control and can simplify the system.

In the present invention, the case where the line space in the vertical direction is uniform has been described, although the present invention is effective even in the case where the line space in the vertical direction is not fixed such as the case where the beam is projected obliquely, for example.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A laser projector comprising:
a laser light source configured to emit a laser light beam modulated in accordance with image information;
a scanner to drive the laser light along two axes in a horizontal direction and a vertical direction in order to produce a two-dimensional scan;
a scanning mirror drive part to produce a drive signal of the scanner;
a light source data conversion part to change an arrangement of the image information in the horizontal direction; and
a timing generation part to synchronize the scanning mirror drive part with the light source data conversion part;
wherein frames of the image information are divided into a first field, a second field, a third field and fourth field, and
in the first field, laser scanning is started from a left most point in the horizontal direction and moves in a rightward direction,
in the second field, laser scanning is started from a point that is equidistance between the left most point in the horizontal direction and a right most point in the horizontal direction and moves in the rightward direction in the horizontal direction,
in the third field, laser scanning is started from the right most point in the horizontal direction and moves in a leftward direction,
in the fourth field, laser scanning is started from the point that is equidistance between the left most point in the horizontal direction and the right most point in the horizontal direction and moves in the leftward direction and
thereby one frame of the image information is scanned two-dimensionally; and
wherein the laser light beam has an elliptical shape with a major axis in the vertical direction and a minor axis in the horizontal direction.

2. A laser projector comprising:
a laser light source configured to emit a laser light beam modulated in accordance with image information;
a scanner to drive the laser light along two axes in a horizontal direction and a vertical direction in response to a drive signal in order to produce a two-dimensional scan;
a scanning mirror drive part to produce the drive signal of the scanner;
a light source data conversion part to change an arrangement of the image information in the horizontal direction; and
a timing generation part to synchronize the scanning mirror drive part with the light source data conversion part;
wherein frames of the image information are divided into odd fields and even fields, and the odd fields are further divided into first odd subfields and second odd subfields, and the even fields are further divided into first even subfields and second even subfields, and
in the first odd subfields, laser scanning is started in a downward vertical direction from a starting point positioned at a first horizontal position and positioned at an upper most point in the vertical direction, wherein the first horizontal position is located a point that is a quarter of the distance between the left most point in the horizontal direction and a right most point in the horizontal direction and the point is closer to the left most point in the horizontal direction,
in the first even subfields, laser scanning is started in the downward vertical direction from a starting point positioned at second horizontal position closer to the right most point in the horizontal direction that is and positioned at the upper most point in the vertical direction, where the second horizontal position is located a point in the horizontal direction that is a quarter of the distance between the left most point in the horizontal direction and the right most point in the horizontal direction and the point is closer to the right most point in the horizontal direction, in the second odd subfields, laser scanning is started in an upward vertical direction from a starting point positioned at the first horizontal position and positioned at a lower most point in the vertical direction, in the second even subfields, laser scanning is started in the upward vertical direction from a starting point positioned at the second horizontal position and positioned at the lower most point in the vertical direction, thereby one frame of the image information being scanned two-dimensionally; and wherein the laser light beam has an elliptical shape with a major axis in the vertical direction and a minor axis in the horizontal direction.

* * * * *